United States Patent Office 3,452,030
Patented June 24, 1969

---

3,452,030
4-(N-ISOBUTYRYLANILINO)-1-BENZYLPIPERIDINE
Harvey B. Hopps, Milwaukee, Wis., assignor to The Aldrich Chemical Company, Inc., Milwaukee, Wis., a corporation of Wisconsin
No Drawing. Filed Dec. 12, 1966, Ser. No. 600,745
Int. Cl. C07d 29/30
U.S. Cl. 260—294
3 Claims

ABSTRACT OF THE DISCLOSURE 4-(N-isobutyrylanilino)-1-benzylpiperidine and the pharmaceutically acceptable nontoxic salts thereof which possess antidepressant activity and are useful as antidepressants in mammals and processes for the preparation thereof.

---

It is an object of the present invention to provide chemical compounds which will serve to counteract psychic depression without stimulating motor activity or appearing to stimulate the central nervous system and have low toxicity.

In accordance with the present invention, there is provided a member selected from the group consisting of a compound of the formula

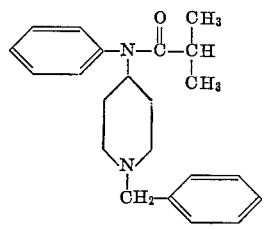

and the pharmaceutically acceptable nontoxic salts thereof.

The pharmaceutically acceptable nontoxic salts include the organic and inorganic acid addition salts, e.g., those prepared from acids such as hydrochloric, sulfuric, sulfanic, tartaric, fumaric, hydrobromic, glycolic, citric, maleic, phosphoric, succinic, acetic, nitric, and the like. Such salts are prepared by conventional methods.

U.S. Patent No. 3,164,600 discloses compounds having some structural similarities to the compounds of this invention as potent analgesic agents. In view of this disclosure, it was quite unexpected when it was discovered that the compounds of the present invention were devoid of analgesic activity but possess potent antidepressant activity. Hence the compounds of this invention are antidepressants and are useful in the treatment of psychic depression.

The preferred compound of the present invention 4-(N-isobutyrylanilino)-1-benzylpiperidine fumarate exhibited an oral $LD_{50}$ in mice of 1,682 mgm./kg. and at doses as low as 10 mgm./kg. p.o. in the mouse given prior to treatment with 5 mgm./kg. reserpine caused the mice to behave normally and prevented the usual sedative effect of reserpine. This is a marked contrast to the results of pretreatment with monoamine oxidase inhibitors before reserpine dosage, as in that instance the mice exhibit great motor stimulation and indeed become so hyperactive that death usually results. Thus the preferred compound of the present invention exhibits marked antidepressant activity without the undesirable motor stimulation of the usual monoamine oxidase inhibitors.

4-(N-isobutyrylanilino)-1-benzylpiperidine of the present invention is prepared by reacting N-benzyl-4-anilinopiperidine with an isobutyryl halide, e.g., chloride, bromide or iodide but preferably the chloride. Preferably the reaction is carried out in the presence of a nonreactive solvent, e.g., benzene, toluene, dimethylformamide, dimethylsulfoxide and the like and in the presence of an acid acceptor such as triethylamine. The reaction is initially exothermic and is preferably carried out below 50° C.; cooling of the reaction mixture may be required. After the exothermic reaction ceases, the reaction mixture is refluxed for several hours to complete the reaction. The compound is conveniently converted to the desired salt by routine procedures.

Alternatively the compounds of this invention may be prepared by the general procedure described in U.S. Patent Nos. 3,164,600, 3,171,838, and 3,161,637, by the reaction of N-benzyl-4-anilinopiperidine with isobutyric anhydride.

N-benzyl-4-anilinopiperidine is a known compound described in U.S. Patent Nos. 3,161,637, 3,171,838, and 3,164,600, Chem. Abstr. 61, P3077; and French Patent No. 1,344,366.

The compound of this invention may be administered as the free base or in the form of its nontoxic addition salts. It may be compounded and formulated into pharmaceutical preparations for oral or parenteral administration with organic or inorganic solid materials or liquids which are pharmaceutically acceptable carriers. Some examples of the carriers which can be used are gelatin capsules, sugars, cellulose derivatives such as carboxymethylcellulose, gelatin, talc, magnesium stearate, vegetable oil such as peanut oil, etc., liquid petroleum, glycerin, sorbitol, ethanol, agar and water. The compositions may take the form of tablets, powders, granules, capsules, suspensions, solutions, and the like.

The composition comprises not more than about 200 mg./kg. per dosage unit and preferably from about 1 to about 200 mg./kg. of a compound of this invention together with a suitable carrier. Such compositions are considered within the scope of this invention.

The compounds of this invention when administered orally or parenterally in an effective amount are effective in the treatment of psychic depression in mammals.

The following examples are intended to illustrate the invention described herein without unduly restricting it.

EXAMPLE 1

Preparation of 4-(N-isobutyrylanilino)-1-benzylpiperidine

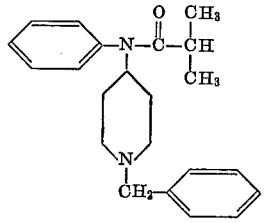

A mixture of 4-anilino-1-benzylpiperidine (20.2 g., 0.076 mole), triethylamine (8.05 g., 0.08 mole) and benzene (150 ml.) was treated dropwise with isobutyryl chloride (8.56 g., 0.08 mole) and benzene (10 ml.) over a 20–30 minute period at or below 5° C. with stirring. The mixture was stirred for one hour during which time the temperature rose to room temperature; then heated at reflux for one hour. The solution was cooled and then concentrated to a paste which was treated with methylene dichloride and 11 g. of potassium carbonate dissolved in a minimum amount of water. The methylene dichloride layer was separated and the aqueous base extracted twice more with methylene dichloride. The methylene dichloride extracts were combined and dried over anhydrous potassium carbonate. The supernatant solution was concentrated to the point of crystallization of the solid base. The IR spectra on the crude base conformed to the expected structure. Recrystallization of the base from cyclohexane yielded 15.6 g. of the pure base, 4-(N-isobutyrylanilino)-1-benzylpiperidine, M.P. 116–120° C.

EXAMPLE 2

4-(N-isobutyrylanilino)-1-benzylpiperidine fumarate

The free base 4-(N-isobutyrylanilino)-1-benzylpiperidine, produced in Example 1, was converted to the fumaric acid salt in a minimum amount of warm methanol. The crude solid was separated by filtration and recrystallized from isopropyl alcohol to yield 17 g. of the fumarate salt, M.P. 188–189° C.

*Analysis.*—Calcd. for $C_{26}H_{32}N_2O_5$: C, 69.00; H, 7.13; N, 6.19. Found: C, 69.10; H, 7.05; N, 6.19.

While this invention has been described in terms of its preferred embodiment, those skilled in the art will appreciate that modifications can be made without departing from the spirit and scope of the invention.

What is claimed is:

1. A compound selected from the group consisting of a compound of the formula

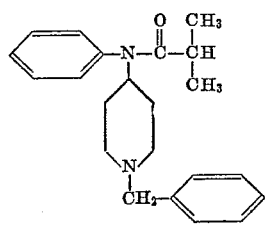

and the pharmaceutically acceptable nontoxic salts thereof.

2. The compound having the formula

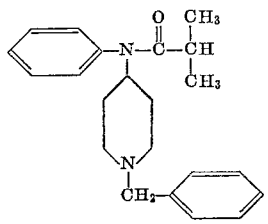

3. The fumaric acid salt of the compound having the formula

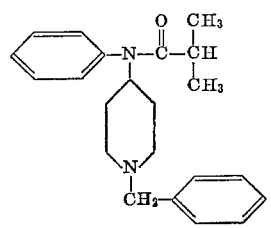

References Cited

UNITED STATES PATENTS

| | | | |
|---|---|---|---|
| 3,161,637 | 12/1964 | Janssen | 260—247.2 |
| 3,164,600 | 1/1965 | Janssen | 260—293.4 |
| 3,171,838 | 3/1965 | Janssen | 260—293.4 |

HENRY R. JILES, *Primary Examiner.*

E. D. LEWIS, *Assistant Examiner.*

U.S. Cl. X.R.

260—999